(12) United States Patent
Pfarrer et al.

(10) Patent No.: US 11,535,292 B2
(45) Date of Patent: Dec. 27, 2022

(54) ADJUSTABLE STEERING ASSEMBLY

(71) Applicants: William Pfarrer, Oakland, MI (US); James A Robertson, White Lake, MI (US); Scott Hale, Fowlerville, MI (US)

(72) Inventors: William Pfarrer, Oakland, MI (US); James A Robertson, White Lake, MI (US); Scott Hale, Fowlerville, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 17/316,160

(22) Filed: May 10, 2021

(65) Prior Publication Data
US 2022/0355848 A1 Nov. 10, 2022

(51) Int. Cl.
*B62D 1/181* (2006.01)
(52) U.S. Cl.
CPC .................................... *B62D 1/181* (2013.01)
(58) Field of Classification Search
CPC ...................................................... B62D 1/181
See application file for complete search history.

(56) References Cited

U.S. PATENT DOCUMENTS

| | | | |
|---|---|---|---|
| 6,578,862 B2 | 6/2003 | Park et al. | |
| 9,664,273 B2 * | 5/2017 | Mehl | F16H 55/24 |
| 9,896,123 B2 | 2/2018 | Maquire et al. | |
| 10,160,479 B2 * | 12/2018 | Cymbal | B62D 5/0403 |
| 10,473,201 B2 * | 11/2019 | Favilla | F16H 1/32 |
| 10,953,912 B2 * | 3/2021 | Rawlings | B62D 6/008 |
| 11,027,764 B2 * | 6/2021 | Chow | B60W 30/182 |

FOREIGN PATENT DOCUMENTS

| | | | | |
|---|---|---|---|---|
| CN | 109017969 A | * | 12/2018 | ............... B62D 1/02 |
| KR | 100559573 B1 | | 3/2006 | |

* cited by examiner

*Primary Examiner* — Drew J Brown
(74) *Attorney, Agent, or Firm* — Ralph E. Smith

(57) ABSTRACT

In at least some implementations, an adjustable steering assembly for a vehicle includes a steering shaft, a steering input that is coupled to the steering shaft, and an adjustment device. The adjustment device has a drive member coupled to one of the steering input or the steering shaft, and a reaction member coupled to the other one of the steering input or the steering shaft. The drive member rotates with said one of the steering input or the steering shaft to which the drive member is coupled to permit steering rotation of the steering shaft, and the drive member is rotated relative to said one of the steering input or the steering shaft to which the drive member is coupled to change the rotational position of the steering input relative to the steering shaft.

20 Claims, 3 Drawing Sheets

ADJUSTABLE STEERING ASSEMBLY

FIELD

The present disclosure relates to an adjustable steering assembly.

BACKGROUND

Vehicles include steering systems with a steering wheel that is fixed to a steering shaft for rotation together to turn vehicle wheels and turn the vehicle. In use of such vehicles over time, forces on the steering system can cause the angle of the wheels to change relative to the steering wheel, or vice versa, and this offset between the steering wheel angle and the vehicle wheel angle is noticeable and may be bothersome to a driver of the vehicle. Such an offset can occur even when the alignment of the wheels is satisfactory and thus, a realignment procedure to correct vehicle wheel angle need not be implemented.

SUMMARY

In at least some implementations, an adjustable steering assembly for a vehicle includes a steering shaft, a steering input that is coupled to the steering shaft, and an adjustment device. The adjustment device has a drive member coupled to one of the steering input or the steering shaft, and a reaction member coupled to the other one of the steering input or the steering shaft. The drive member rotates with said one of the steering input or the steering shaft to which the drive member is coupled to permit steering rotation of the steering shaft, and the drive member is rotated relative to said one of the steering input or the steering shaft to which the drive member is coupled to change the rotational position of the steering input relative to the steering shaft.

In at least some implementations, the drive member includes a first gear having teeth and the reaction member includes a second gear having teeth meshed with the teeth of the first gear, and wherein, when rotation of the steering shaft is inhibited or prevented, rotation of the first gear relative to the second gear causes rotation of the steering input relative to the steering shaft. The drive member may be coupled to an interface shaft by which the drive member is rotated relative to the reaction member and the interface shaft is rotatable about an axis and the first gear is fixed to the interface shaft. The steering input may include a body and the interface shaft may be coupled to the body so that forces on the first gear are transmitted to the steering input through the interface shaft and the body. The interface shaft may include an actuating feature adapted to be engaged to rotate of the interface shaft and first gear.

In at least some implementations, the drive member is a worm and the reaction member is a worm gear having teeth meshed with the worm. The worm may be coupled to the steering input so that the worm rotates about an axis of rotation of the steering input and the worm rotates relative to the steering input about an axis of rotation of the worm. The worm may rotate about an axis that is not parallel to an axis of rotation of the steering shaft, and the axis of rotation of the worm may be perpendicular to the axis of rotation of the steering shaft. In at least some implementations, the worm gear is fixed to the steering shaft for rotation with the steering shaft.

In at least some implementations, the assembly includes a rotation limiter having one or more limit surfaces, with at least one limit surface carried by the steering input and at least one limit surface carried by the steering shaft. Wherein one of the at least one limit surface carried by the steering input engages one of the at least one limit surface carried by the steering shaft to limit relative rotation between the steering input and the steering shaft.

In at least some implementations, an adjustable steering assembly for a vehicle, includes a steering shaft, a steering input that is coupled to the steering shaft, a first gear coupled to the steering input, and a second gear coupled to the steering shaft. The first gear rotates with the steering input about an axis of rotation of the steering shaft to permit steering rotation of the steering shaft, and the first gear is rotated relative to the steering input to change the rotational position of the steering input relative to the steering shaft.

In at least some implementations, the first gear rotates relative to the second gear to change the rotational position of the steering input relative to the steering shaft. In at least some implementations, the first gear is a worm and the second gear is a worm gear, and wherein the worm rotates about an axis that is not parallel to the axis of rotation of the steering shaft. In at least some implementations, the worm is carried by an interface shaft that includes an actuating feature by which the interface shaft and worm are rotated. In at least some implementations, the worm gear is fixed against rotation relative to the steering shaft.

In at least some implementations, the first gear and second gear are meshed and rotation of the steering wheel to rotate the steering shaft does not cause relative rotation between the first gear and second gear. In at least some implementations, a rotation limiter having one or more limit surfaces, with at least one limit surface carried by the steering input and at least one limit surface carried by the steering shaft, and wherein one of the at least one limit surface carried by the steering input engages one of the at least one limit surface carried by the steering shaft to limit relative rotation between the steering input and the steering shaft.

Accordingly, in at least some implementations, the steering input is rotated to rotate the steering shaft. When adjustment of the steering input angle relative to the steering shaft is desired, the drive member may be moved to rotate the steering input relative to the steering shaft. Such rotation may be limited in amount by a rotation limiter which may include opposed surfaces that become engaged at the rotational limit of the steering input relative to the steering shaft.

The steering wheel may be rotated by an electrically driven actuator (e.g. a motor) or by a person. The drive member may be driven by an electrically driven actuator or by a person. In at least some implementations, rotation of the steering wheel relative to the steering shaft does not occur during steering rotation of the steering wheel and steering shaft, and such relative rotation may be prevented by interaction of the drive member and reaction member, which may be a worm and worm gear in at least some implementations.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
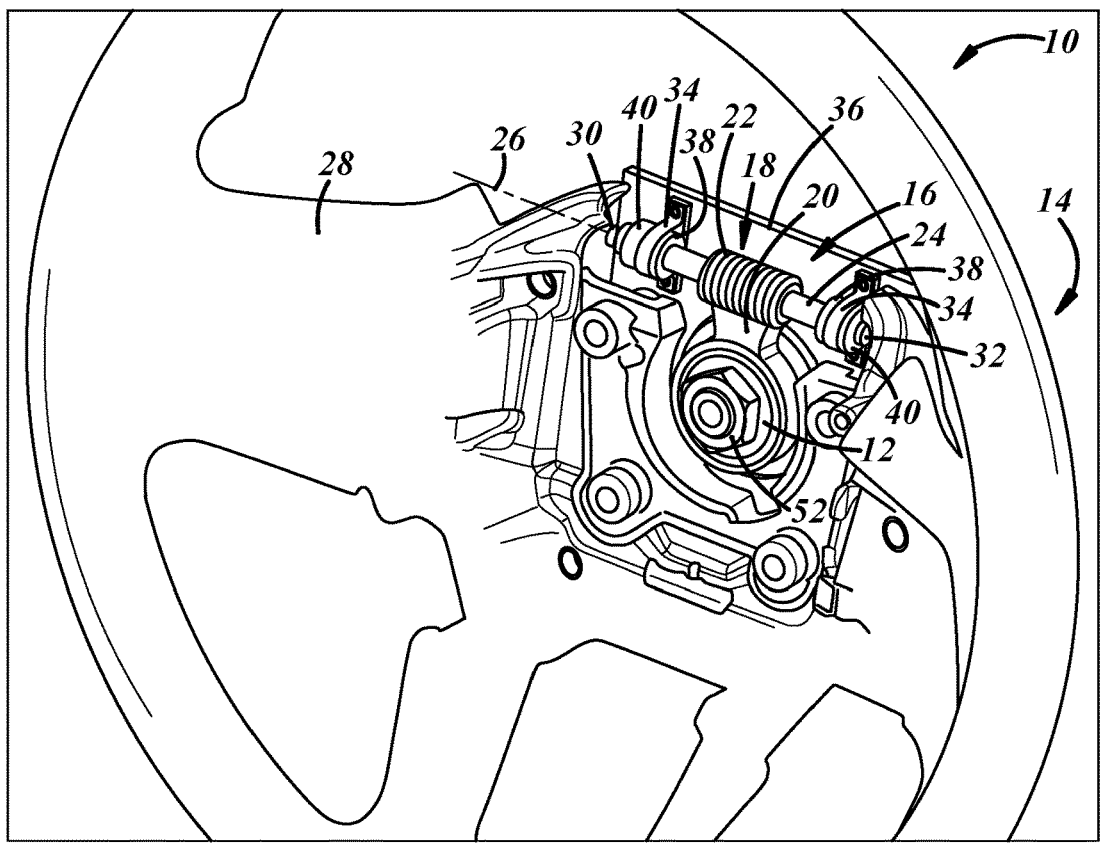
FIG. 1 is a perspective view of a steering assembly including a steering input and part of a steering shaft.
Figure 2:
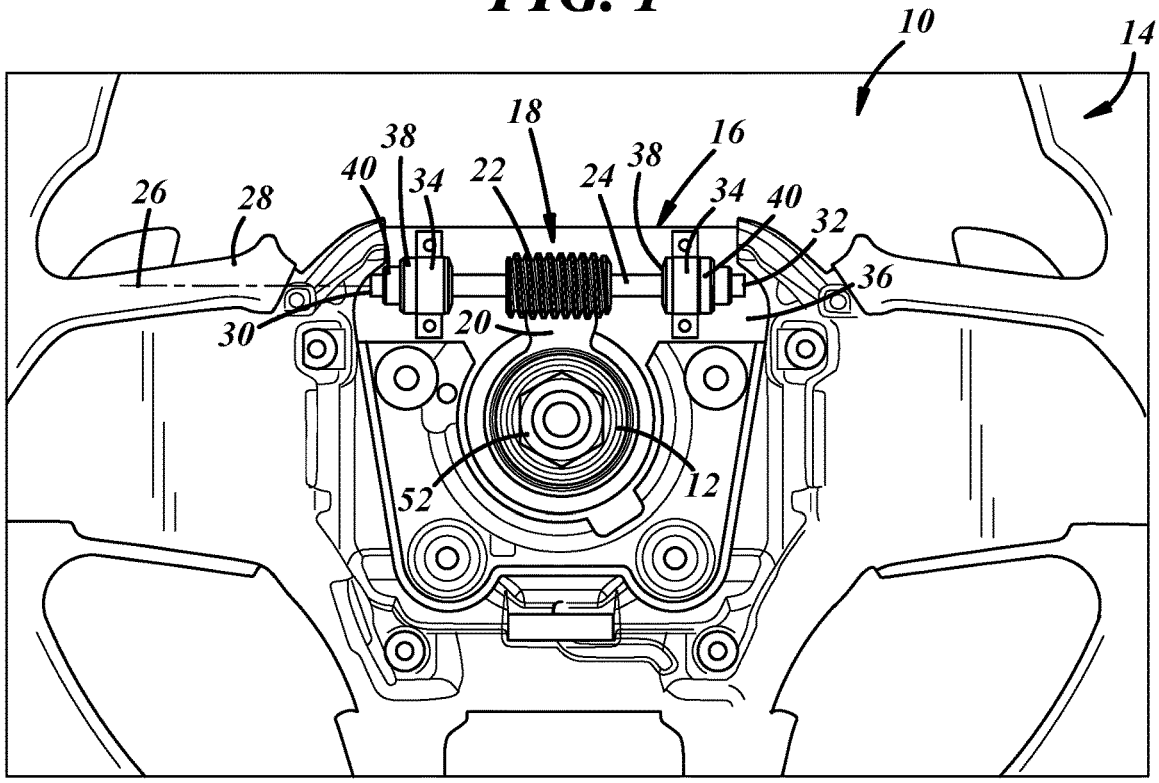
FIG. 2 is a front view of the steering assembly.

Referring in more detail to the drawings, FIGS. 1 and 2 illustrate a steering assembly 10 used to turn wheels of a vehicle so that the vehicle may be steered. The steering assembly 10 includes a steering shaft 12 coupled to a steering input which in this example is a steering wheel 14. The steering shaft 12 rotates with the steering wheel 14 as a user or an actuator (e.g. one or more electric motors) rotates the steering input 14 or steering shaft 12 to steer the vehicle. The steering shaft 12 may be coupled to the vehicle wheels in a known manner to turn the wheels and thereby turn the vehicle.

To permit adjustment of the rotational position of the steering wheel 14 relative to the steering shaft 12, the steering assembly 10 includes an adjustment device 16. The adjustment device 16 includes a drive member 18 coupled to one of the steering wheel 14 and the steering shaft 12, and a reaction member 20 coupled to the other one of the steering wheel 14 and the steering shaft 12. Rotation of the drive member 18 relative to the reaction member 20 causes rotation of the steering wheel 14 relative to the steering shaft 12.

In the example shown in the drawings, the drive member 18 is a gear, specifically a worm 18, but other types of gears, or actuators that are not a gear, may be used as set forth in more detail below. For example, a push/pull sliding mechanism could be used, with a lock to prevent relative movement after adjustment. In the example shown, the worm 18 has at least one tooth, shown as a helical tooth 22 or thread but could have multiple teeth and is carried by an interface shaft 24 for rotation with the interface shaft 24 about an axis 26 of the interface shaft 24. The interface shaft 24 is connected to a body 28 of the steering wheel 14, and in the example shown, the interface shaft 24 is captured adjacent opposed ends 30, 32 by brackets 34 fixed to a plate 36 of the steering wheel body 28. The brackets 34 permit rotation of the interface shaft 24 relative to the brackets 34 and plate 36, but otherwise the interface shaft 24 does not move relative to the plate 36. A bearing or bearings 38 may be provided between each bracket 34 and the interface shaft 24, if desired. To maintain the interface shaft 24 in a desired position relative to the brackets 34, fittings 40 may be provided outboard of the brackets 34. In the example shown, the worm 18 is located between the brackets 34, but other implementations may be used, including implementations in which one or more than two brackets 34 are used, with the worm 18 located in any desired position relative to the bracket(s).

Figure 3:
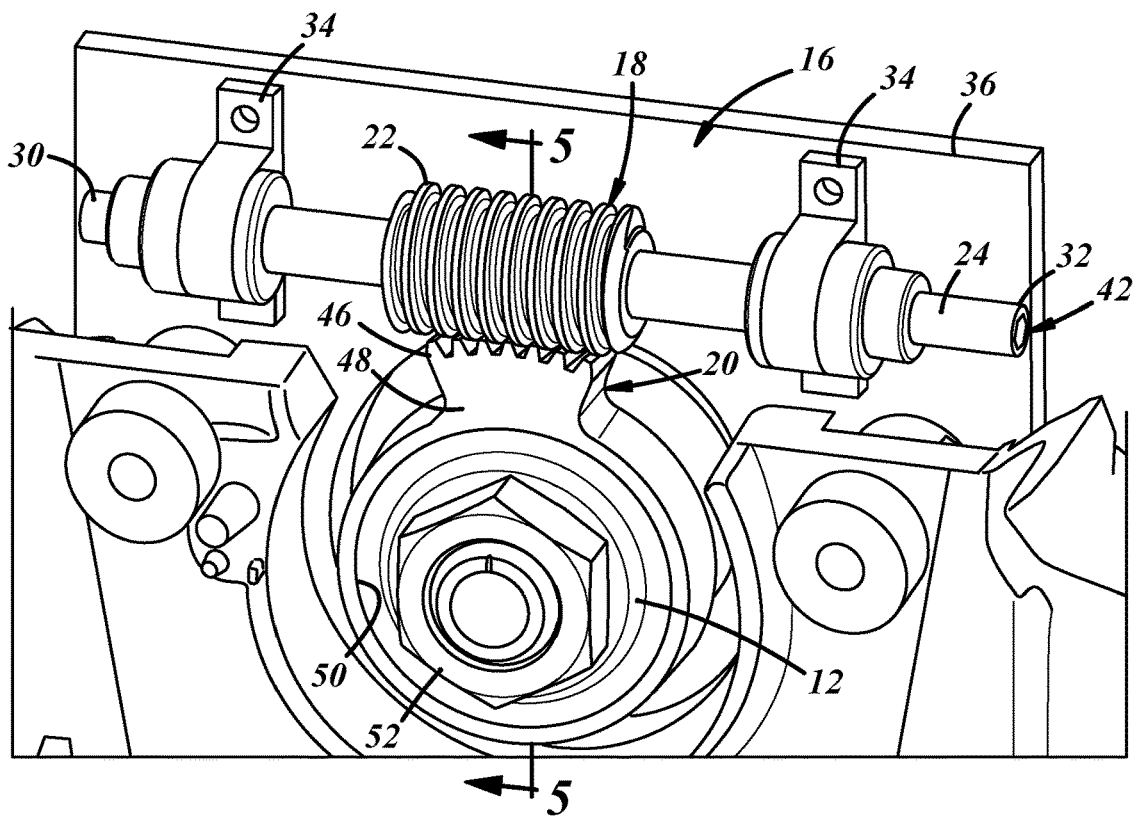
FIG. 3 is a perspective view of a portion of the steering assembly showing an adjustment device.

In at least some implementations, the interface shaft 24 includes an actuating feature 42 (FIGS. 3 and 4) which may be carried by or formed in the interface shaft 24, such as at a first end 30 of the shaft. The actuating feature 42 may be adapted to permit rotation of the interface shaft 24 by a tool, like a screwdriver (where the actuating feature 42 may include, for example, a slot, X-shaped recess or a socket), pliers, socket or wrench (where the actuating feature 42 may include a flat portion on the exterior surface of the shaft), allen wrench or torx tool (where the actuating feature 42 may include a socket shaped for close receipt of such tool), or other feature, to permit manual rotation of the shaft and worm 18 by a user. The actuating feature 42 could include a knob or lever manually graspable by a user to permit manual rotation of the interface shaft 24 and worm 18 without a tool. In other implementations, the actuating feature 42 may interact with a motorized actuator that causes rotation of the tool as commanded by a user or by a controller and executable program (e.g. based on sensor feedback indicating the need to rotate the worm 18), rather than rotation being achieved manually. When manual actuation is required, the actuating feature 42 may be accessible to a user, such as by being exposed between a back side of the steering wheel body 28 and a dashboard or instrument panel of the vehicle, or by being exposable upon removal of a cover connected to the steering wheel body 28 and overlying the interface shaft 24.

In at least some implementations, the reaction member 20 is coupled to the steering shaft 12 for rotation with the steering shaft 12. At least part of the reaction member 20 is engaged by the drive member 18 as the drive member 18 moves. In at least some implementations, the reaction member 20 is a worm gear 20 with at least one, and shown as multiple radially oriented teeth 46 at least some of which are meshed with the worm tooth 22. The worm gear 20 has a body 48 that is fixed to the steering shaft 12. In the example shown, the worm gear body 48 includes an opening 50 in which part of the steering shaft 12 is received, and splines 51 (FIG. 6) or other connection feature(s) couple the worm gear 20 to the steering shaft 12 so that they rotate together. The connection feature can be any feature, structure or component that inhibits or prevents relative rotation between the worm gear 20 and steering shaft 12. The connection feature can be integrally formed in one or both of the worm gear 20 and steering shaft 12 (e.g. splines, flat surfaces, etc) or a separate component like a set screw or other. A fastener, such as a nut 52 that is threaded onto the steering shaft 12 may prevent axial movement of the worm gear 20 relative to the steering shaft 12 to maintain the worm gear 20 on the steering shaft 12 and meshed with the worm 18.

Figure 5:
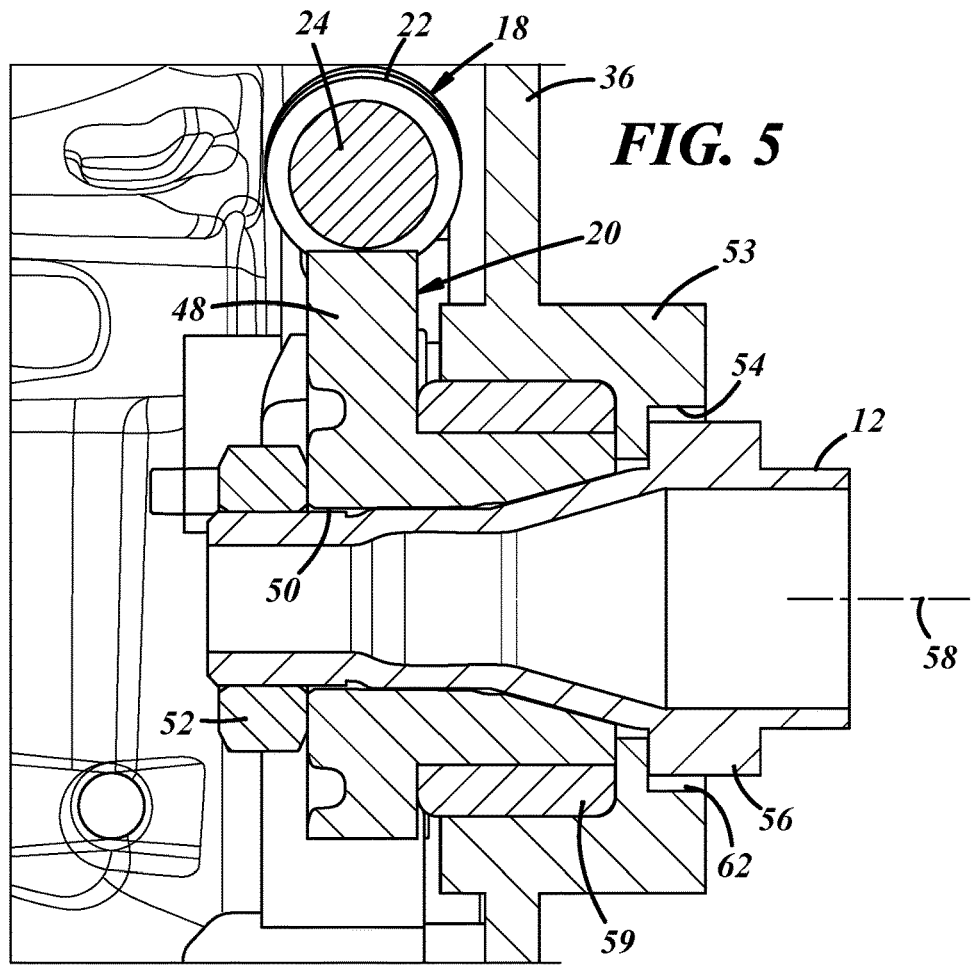
FIG. 5 is a cross-sectional view of part of the steering assembly.
Figure 6:
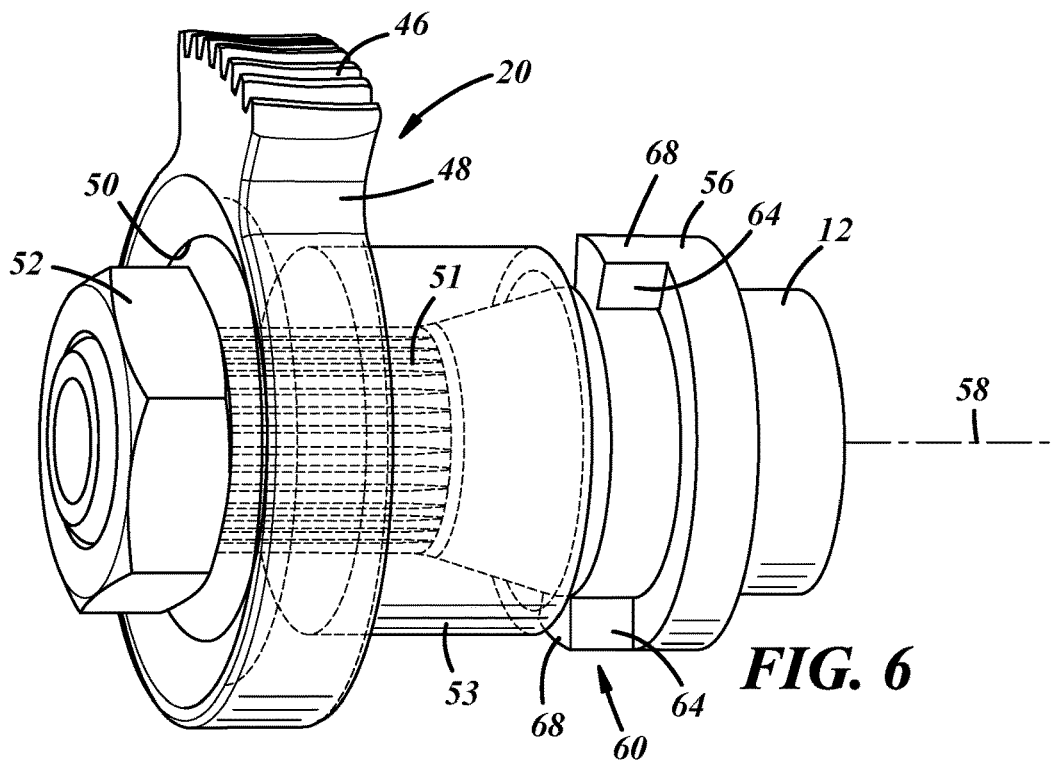
FIG. 6 is a perspective view of part of a steering shaft assembly.

The nut 52 may also maintain the steering wheel 14 on the steering shaft 12. As shown in FIGS. 5 and 6, the plate 36 of the steering wheel body 28 has a cylindrical hub 53 defining an opening 54 through which the steering shaft 12 is received, and the plate 36 is trapped between a radially outwardly extending flange 56 (where radially is with reference to the steering shaft axis 58, which is also the axis about which the steering input rotates) or other stop surface on the steering shaft 12 and the worm gear 20. Thus, when the nut 52 is installed on the steering shaft 12, the steering wheel 14 is retained on and prevented from being removed from the steering shaft 12. As shown in FIG. 5, the worm gear body 48 may extend into the hub 53 and may be supported by a bushing or bearing 59.

In operation of the steering assembly 10 including the adjustment device 16, the worm 18 moves in two ways. First, as the steering wheel 14 is turned to steer the vehicle (either manually or via an actuator that rotates the steering wheel 14 or steering shaft 12), the steering wheel body 28 rotates about the steering shaft axis 58 and the worm 18 is rotated with the steering input 14 about the steering shaft axis 58. Because the worm gear teeth 46 are meshed with the worm 18, this rotation of the worm 18 causes rotation of the steering shaft 12, and corresponding rotation of the vehicle wheels to steer the vehicle. Forces on the steering input 14 are transmitted to the steering shaft 12 via the worm 18 and worm gear 20, preferably without relative rotation between the worm 18 and worm gear 20.

In this way, the worm 18 and worm gear 20 can be constructed such that the worm 18 is not rotated about the interface shaft axis 26 during such steering movement of the steering wheel 14. That is, the worm 18 is not backdriven by rotation of the steering wheel 14. In at least some implementations, the worm 18 rotates about an axis 26 that is not parallel to the steering shaft axis 58, and the axis of rotation 26 of the worm 18 may be perpendicular to the axis of rotation 58 of the steering shaft 12.

Second, the worm 18 may be rotated relative to the steering wheel body 28, about the worm axis 26. This may be done, for example, via the actuating feature 42. In at least some implementations, rotation of the worm 18 about the worm axis 26 does not cause rotation of the steering shaft 12 and instead causes rotation of the steering wheel 14 relative to the steering shaft 12. The steering shaft 12 may be held against rotation or the forces on the worm gear 20 from the rotation worm 18 are insufficient to rotate the steering shaft 12, at least when the vehicle wheels are on the ground and bearing the weight of the vehicle.

In use of a vehicle over time, forces on the vehicle steering system can cause the angle of the wheels to change relative to the steering wheel 14, or vice versa, and this offset between the steering wheel angle and the vehicle wheel angle is noticeable and may be bothersome to a driver of the vehicle. Such an offset can occur even when the alignment of the wheels is satisfactory and thus, a realignment procedure to correct vehicle wheel angle need not be implemented. Instead, with the adjustment assembly described herein, adjustment of the steering wheel angle can be accomplished such that the steering wheel angle corresponds better to the angle of the vehicle wheels. That is, the angular or rotational orientation of the steering wheel 14 relative to the steering shaft 12 may be adjusted by rotation of the worm 18 relative to the steering wheel 14 (e.g. about the worm axis 26). This may be desirable to permit a user or maintenance personnel to easily straighten the steering wheel 14 relative to the steering shaft 12 and vehicle generally, so that the steering wheel 14 is oriented properly with respect to a direction in which the vehicle travels for a given steering angle.

Figure 4:
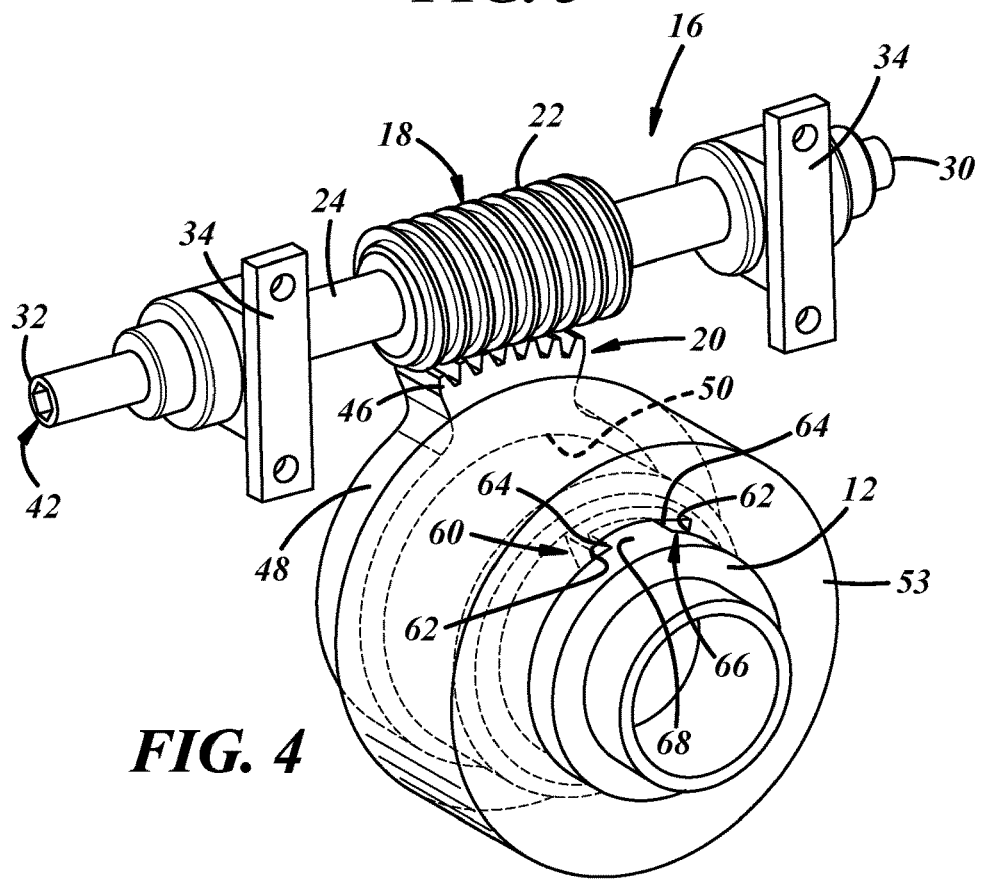
FIG. 4 is a perspective view showing the adjustment device and part of a steering shaft.

In at least some implementations, such as shown in FIGS. 4 and 6, a rotation limiter 60 is incorporated into the steering assembly 10 to limit the extent to which the steering wheel angle may be adjusted relative to the steering shaft 12. The rotation limiter 60 may also limit to relative motion of the steering wheel 14 relative to the steering shaft 12 even without an adjustment being intended, that is, without rotation of the worm 18 about the worm/interface shaft axis 26. For example, if the worm gear 20 were to fail such that the worm 18 and worm gear 20 were no longer coupled together, the rotation limiter 60 may permit at least some transfer of steering wheel rotation to the steering shaft 12 to permit vehicle steering. In at least some implementations, the rotation limiter 60 has at least one limit surface 62 carried by the steering input 14 and at least one limit surface 64 carried by the steering shaft 12. A limit surface 62 carried by the steering input 14 engages a limit surface 64 carried by the steering shaft 12 to limit relative rotation between the steering input 14 and the steering shaft 12. Suitably arranged limit surfaces 62, 64 may become engaged when the steering wheel 14 is rotated a maximum amount relative to the steering shaft 12 in either direction of rotation.

In the example shown, the steering wheel body 28 includes two limit surfaces 62 and the steering shaft 12 includes at least one limit surface 64, which for ease of description will hereafter be referred to as a stop surface. The limit surfaces 62 of the steering wheel body 28 (e.g. the plate 36) are defined by circumferentially spaced apart end surfaces of a cavity 66 formed in the plate 36, and the steering shaft 12 includes a projection 68 that extends into the cavity 66. The projection may extend from the flange 56 or be separate from the flange, as desired. Upon maximum rotation of the steering wheel 14 relative to the steering shaft 12 in a first direction, one of the limit surfaces 62 engages a corresponding stop surface 64 defined by the projection 68 and prevents further relative rotation in that direction. Upon maximum rotation of the steering wheel 14 relative to the steering shaft 12 in a second direction, the other limit surface 62 engages another stop surface 64 of the projection 68 and prevents further relative rotation in that direction. Thus, even if the worm 18 or worm gear 20 fails, the steering shaft 12 can still be turned when a limit surface 62 is engaged with a stop surface 64. In at least some implementations, the limit surfaces 62 and stop surfaces 64 are arranged to permit between 10 and 20 degrees of rotation of the steering wheel 14 relative to the steering shaft 12. Of course, the rotation limiter 60 may be constructed differently than with the limit surfaces 62 of the plate 36 and stop surfaces 64 of the projection 68, to provide a positive engagement of a surface of or fixed to the steering wheel 14 and a surface of or fixed to the steering shaft 12 to limit maximum relative rotation of the steering wheel 14.

While the drive member 18 in the illustrated example is a worm 18 and the reaction member 20 is a worm gear 20, other gears may be used, including spur gears or planetary gears, to name a couple of many alternatives. Thus, in at least some implementations, the drive member 18 includes a first gear having teeth and the reaction member 20 includes a second gear having teeth meshed with the teeth of the first gear, and at least when rotation of the steering shaft 12 is inhibited or prevented, rotation of the first gear relative to the second gear causes rotation of the steering wheel 14 relative to the steering shaft 12. If such gears might be backdriven during rotation of the steering wheel 14 associated with steering the vehicle (and not adjustment of the steering wheel angle), then a locking device may be incorporated. Such locking device can be released before steering wheel 14 adjustment and reset after such adjustment to permit normal steering use of the steering assembly 10. The locking device could include, by way of non-limiting examples, a clutch, cotter pin, set screw, or a clamp. In the example shown, a lever or cam driven lock could be used to ensure meshing of the worm and worm gear, to reduce or eliminate backlash or clearance between them and reduce or eliminate rotation of the steering input that does not result in a like amount of steering shaft rotation. Further, the worm could be coupled to the steering shaft and the worm gear could be coupled to the steering input, if desired.

In at least some implementations, the components of the steering assembly remain coupled in normal use and when an adjustment of the steering wheel angle is performed. That is, no lock, clamp or component is loosened in such a manner that the steering wheel is not connected or is loosely connected to the steering shaft (even if rotation limiters are provided so that the steering wheel is not completely rotationally disconnected from the steering shaft). In at least some implementations, absent failure of a component (e.g. the worm gear, worm, interface shaft, bracket or the like in the illustrated implementation) rotation of the steering wheel to steer the vehicle (i.e. not rotation caused by rotation of the worm to adjust the steering wheel angle) will cause a corresponding rotation of the steering shaft. If desired, in the example shown a lever or cam lock could be used to bias the worm into meshed engagement with the worm gear and reduce or eliminate backlash or clearance between the worm and worm gear, and thereby reduce or eliminate rotation of the steering input that does not result in a like amount of steering shaft rotation. Further, the worm could be coupled to the steering shaft and the worm gear could be coupled to the steering input, if desired.

What is claimed is:

1. An adjustable steering assembly for a vehicle, comprising:
   a steering shaft that is rotatable;
   a steering input that is coupled to the steering shaft; and
   an adjustment device having a drive member coupled to one of the steering input or the steering shaft, and a reaction member coupled to the other one of the steering input or the steering shaft, wherein the drive member rotates with said one of the steering input or the steering shaft to which the drive member is coupled to permit steering rotation of the steering shaft, and the drive member is rotated relative to said one of the steering input or the steering shaft to which the drive member is coupled, while the drive member is still coupled to said one of the steering input or the steering shaft, to change the rotational position of the steering input relative to the steering shaft.

2. The assembly of claim 1 wherein the drive member is a worm and the reaction member is a worm gear having teeth meshed with the worm.

3. The assembly of claim 2 wherein the worm is coupled to the steering input so that the worm rotates about an axis of rotation of the steering input and the worm rotates relative to the steering input about an axis of rotation of the worm.

4. The assembly of claim 2 wherein the worm rotates about an axis that is not parallel to an axis of rotation of the steering shaft.

5. The assembly of claim 4 wherein axis of rotation of the worm is perpendicular to the axis of rotation of the steering shaft.

6. The assembly of claim 4 wherein the worm gear is fixed to the steering shaft for rotation with the steering shaft.

7. The assembly of claim 1 which also includes a rotation limiter having one or more limit surfaces, with at least one limit surface carried by the steering input and at least one limit surface carried by the steering shaft, and wherein one of the at least one limit surface carried by the steering input engages one of the at least one limit surface carried by the steering shaft to limit relative rotation between the steering input and the steering shaft.

8. The assembly of claim 1 wherein, when the drive member is rotated relative to said one of the steering input or the steering shaft to which the drive member is coupled, the reaction member remains coupled to the other one of the steering input or the steering shaft.

9. The assembly of claim 1 wherein the drive member includes a first gear having at least one tooth and the reaction member includes a second gear having at least one tooth meshed with the first gear, and wherein, when rotation of the steering shaft is inhibited or prevented, rotation of the first gear relative to the second gear causes rotation of the steering input relative to the steering shaft.

10. An adjustable steering assembly for a vehicle, comprising:
    a steering shaft that is rotatable;
    a steering input that is coupled to the steering shaft; and
    an adjustment device having a drive member coupled to one of the steering input or the steering shaft, and a reaction member coupled to the other one of the steering input or the steering shaft, wherein the drive member rotates with said one of the steering input or the steering shaft to which the drive member is coupled to permit steering rotation of the steering shaft, and the drive member is rotated relative to said one of the steering input or the steering shaft to which the drive member is coupled to change the rotational position of the steering input relative to the steering shaft, wherein the drive member includes a first gear having at least one tooth and the reaction member includes a second gear having at least one tooth meshed with the first gear, and wherein, when rotation of the steering shaft is inhibited or prevented, rotation of the first gear relative to the second gear causes rotation of the steering input relative to the steering shaft.

11. The assembly of claim 10 wherein the drive member is coupled to an interface shaft by which the drive member is rotated relative to the reaction member and the interface shaft is rotatable about an axis and the first gear is fixed to the interface shaft.

12. The assembly of claim 11 wherein the steering input includes a body and the interface shaft is coupled to the body so that forces on the first gear are transmitted to the steering input through the interface shaft and the body.

13. The assembly of claim 11 wherein the interface shaft includes an actuating feature adapted to be engaged to rotate of the interface shaft and first gear.

14. The assembly of claim 10 wherein the drive member is a worm and the reaction member is a worm gear having teeth meshed with the worm.

15. An adjustable steering assembly for a vehicle, comprising:
    a steering shaft;
    a steering input that is coupled to the steering shaft;
    a first gear coupled to the steering input; and
    a second gear coupled to the steering shaft, wherein the first gear rotates with the steering input about an axis of rotation of the steering shaft to permit steering rotation of the steering shaft, and the first gear is rotated relative to the steering input to change the rotational position of the steering input relative to the steering shaft, and wherein the first gear rotates relative to the second gear to change the rotational position of the steering input relative to the steering shaft.

16. The assembly of claim 15 wherein the first gear is a worm and the second gear is a worm gear, and wherein the worm rotates about an axis that is not parallel to the axis of rotation of the steering shaft.

17. The assembly of claim 16 wherein the worm is carried by an interface shaft that includes an actuating feature by which the interface shaft and worm are rotated.

18. The assembly of claim 16 wherein the worm gear is fixed against rotation relative to the steering shaft.

19. The assembly of claim 15 wherein the first gear and second gear are meshed and rotation of the steering wheel to rotate the steering shaft does not cause relative rotation between the first gear and second gear.

20. The assembly of claim 15 which also includes a rotation limiter having one or more limit surfaces, with at least one limit surface carried by the steering input and at least one limit surface carried by the steering shaft, and wherein one of the at least one limit surface carried by the steering input engages one of the at least one limit surface carried by the steering shaft to limit relative rotation between the steering input and the steering shaft.

* * * * *